(12) United States Patent
Nakagawa et al.

(10) Patent No.: US 7,678,324 B2
(45) Date of Patent: Mar. 16, 2010

(54) METHOD FOR FORMING A HOLLOW PLASTIC PRODUCT

(75) Inventors: Tatsuya Nakagawa, Chiba-ken (JP); Yasuo Ezaki, Gunma-ken (JP)

(73) Assignee: Excell Corporation, Matsudo (JP)

( * ) Notice: Subject to any disclaimer, the term of this patent is extended or adjusted under 35 U.S.C. 154(b) by 92 days.

(21) Appl. No.: 11/978,363

(22) Filed: Oct. 29, 2007

(65) Prior Publication Data
US 2009/0008822 A1    Jan. 8, 2009

Related U.S. Application Data

(62) Division of application No. 10/940,163, filed on Sep. 13, 2004, now Pat. No. 7,316,427.

(30) Foreign Application Priority Data

Sep. 16, 2003   (JP) ............................. 2003-322944

(51) Int. Cl.
    *B28B 21/74*   (2006.01)
(52) U.S. Cl. ....................... 264/534; 264/250; 264/345; 264/513; 264/516; 285/288.1
(58) Field of Classification Search ................. 264/250, 264/345, 513, 516, 534; 285/288.1
    See application file for complete search history.

(56) References Cited

U.S. PATENT DOCUMENTS

| 3,743,566 A | 7/1973 | Louthan et al. |
| 4,875,714 A | 10/1989 | Lee |
| 5,125,431 A | 6/1992 | Vogel et al. |
| 5,160,476 A * | 11/1992 | Ijyuin et al. ................. 264/563 |
| 5,388,869 A | 2/1995 | Suzuki et al. |
| 5,544,849 A | 8/1996 | Peterson et al. |
| 5,601,315 A | 2/1997 | Bunger et al. |
| 6,537,484 B2 * | 3/2003 | Nakagawa et al. .......... 264/513 |
| 2001/0042947 A1 * | 11/2001 | Nakagawa et al. .......... 264/515 |

* cited by examiner

*Primary Examiner*—Joseph S. Del Sole
*Assistant Examiner*—Stephen Sollenberger
(74) *Attorney, Agent, or Firm*—Cohen Pontani Lieberman & Pavane LLP

(57) ABSTRACT

A method for manufacturing a hollow plastic product. The method includes the steps of forming a reinforce member in a desired shape having a defined welding surface formed with a first hole by injection molding; forming a hollow main body by blow molding using said reinforce member as an insert, thereby having said reinforce member integrally formed with said hollow main body and having a portion of said hollow main body extended into said first hole in the shape of a mesa when blow-molded; thermally welding a top end surface of a connector pipe to said welding surface and also to a top surface of said mesa shaped portion; and forming a second hole in said top surface of said mesa shaped portion to be aligned with said second hole, thereby forming a fluidic communication passage between an interior of said hollow main body and an interior of said connector pipe.

3 Claims, 3 Drawing Sheets

METHOD FOR FORMING A HOLLOW PLASTIC PRODUCT

CROSS-REFERENCE TO RELATED APPLICATIONS

This is a division of application Ser. No. 10/940,163, filed on Sep. 13, 2004 now U.S. Pat. No. 7,316,427. Priority is claimed on Japanese Patent Application No. 2003-322944, filed on Sep. 16, 2003. The entire content of application Ser. No. 10/940,163 is incorporated herein by reference.

BACKGROUND OF THE INVENTION

1. Field of the Invention

This invention generally relates to a hollow plastic product and its manufacturing method, and, in particular, to a hollow plastic product having a connector pipe, which may be used as a duct, hose, tube or the like for flowing a gas, such as air, or liquid, such as water and its manufacturing method. In particular, a hollow plastic product of the present invention may be advantageously used as a duct, hose, tube or the like of an air intake system or a fuel supply system to be used in combination with an internal combustion engine of an automobile.

2. Description of the Related Art

Among the components of an air intake system of an automobile, blow molded products are used for ducts, hoses, tubes for introducing air into an internal combustion engine, a blowby hose for returning a blowby gas containing the oil components that are produced at the engine to these ducts, etc., and components for connecting the bypass pipe to the air intake duct during idling. Such hollow plastic products as these ducts, pipes and tubes are often added with a connector pipe for establishing a connection among these components for operating the engine and its associated control equipment. For example, it is so structured that the blowby gas containing the oil components produced at the engine is returned from the engine crank case to the air intake duct and the bypass pipe during idling is connected to the air intake duct, in which case a connector pipe is provided at each connection.

Heretofore, in the case of adding a connector pipe having such a function to a blow-molded hollow product, a connector pipe molded by injection molding was used as an insert in molding, or a connector pipe was thermally welded afterwards. In particular, in the case where the adherence provided by insert molding is poor and a required air-tightness cannot be attained, use was made of a method of welding a connector pipe to a blow-molded product.

These ducts, hoses and tubes generally differ in the outer diameter of a main body as well as the diameter of a connection portion depending on the size of a companion component to be connected and a required flow rate, and a connector pipe added to the main body is also required to have a diameter in compliance with its companion component to be connected. For this reason, there is a case in which a connector pipe to be added to such ducts, hoses and tubes which have been manufactured by blow molding is required to have a diameter larger than the outer diameter of the main body of such blow-molded ducts, hoses and tubes.

It is, of course, possible to mold such ducts, hoses and tubes with a portion, to which a connector pipe having a larger diameter to be added, partially increased in outer diameter when blow molding. However, when such a portion of partially increased in outer diameter is formed by blow molding, the blow-up rate of a parison, i.e., a cylinder of a molten resin, supplied at the time of molding increases so that the thickness of that portion of the main body becomes smaller than the rest. In this manner, since such a blow-molded portion which has been increased in outer diameter becomes thinner, if, for example, a connector pipe is to be added to that portion by insert molding, the adherence strength of the insert becomes poor so that there is an increased chance for the insert to be disassembled, or, in some cases, the parison, when blown up, breaks to thereby form a hole. In addition, in the case of adding a connector pipe by thermal welding, a thin portion of a blow-molded product may become so deformed due to the heat at a melting step of thermal welding that it is impossible to complete the thermal welding.

Besides, there is a case in which flexibility is required for blow-molded ducts, hoses and tubes. In this case, since use is made of a soft resin in forming a main body to be blow molded, if a connector pipe is to be added to such a flexible duct, hose or a tube, it will easily fall off because of poor adherence strength if added by insert molding, and thermal welding cannot be used because the flexible blow-molded main body would become softer and deform undesirably during the pressure bonding stage of thermal welding.

In such conventional methods as described above, if a connector pipe was added to a blow-molded hollow product of a duct, pipe or tube, in particular, both comparable in diameter, the portion of the product to which the connector pipe was added became thinner, so that such problems as reductions of adherence strength, formation of holes and incapability of using thermal welding were brought about. The structure and size of a connector pipe to be added to a blow-molded hollow product was limited. Moreover, in the case of a blow-molded duct, hose or tube having flexibility, since the main body of such a product was made of a soft resin, there was a disadvantage of poor adherence strength of a connector pipe when added and there was also a problem of incapability of using thermal welding because the main body became too soft when heat was added during thermal welding. Thus, the material to be used for the main body was also limited.

FIG. 4 illustrates a structure resulting from a conventional thermal welding process as an example. As shown, a connector pipe 55 is added to a blow-molded hose 11 by thermal welding. In this case, however, if the diameter of connector pipe 55 is larger, a welding area at a welding portion 33 becomes smaller, so that the welding or adherence strength is reduced. Thus, the design of connector pipe 55 is limited and there is a case in which a desired product cannot be produced. In addition, since the welding portion 33 of blow-molded hose 11 is defined by a portion where the parison is enlarged during a blow-molding process, it becomes thinner, which tends to make it difficult to carry out thermal welding properly.

Furthermore, if the blow-molded hose 11 is made of a soft resin material, there may be a case where thermal welding cannot be applied since the hose 11 may become too soft when heat is applied, thereby causing the hose to be deformed.

SUMMARY OF THE INVENTION

Disclosed herein is a hollow plastic product comprising: a blow-molded hollow main body; a reinforce member having a defined welding surface and integrally formed with the main body; a connector pipe having one end surface thermally welded to the defined welding surface of the reinforce member to define a fluidic communication between the main body and the connector pipe.

Preferably, the main body has a hole exposed in the defined welding surface of the reinforce member. Preferably, the reinforce member extends around a portion of the outer surface of the main body. Preferably, the reinforce member is integrally formed with the main body by insert molding. The blow-molded main body is preferably one of a duct, hose or tube in structure. The portion of the main body where the reinforce member is integrally formed is partially increased in diameter to define a hole which is to be exposed in the defined welding surface of the reinforce member. The welding surface of the reinforce member is also formed with a hole which is aligned in position with the hole of the main body. Preferably, the welding surface is flat and the end surface of the connector pipe to be connected to the welding surface is also flat correspondingly.

A clamp structure is preferably formed between the main body and the reinforce member. The clamp structure includes a plurality of dove-tail projections provided in a circumferential direction at least at one of the main body and the reinforce member.

In accordance with one aspect of the present invention there is provided a method for manufacturing a hollow plastic product including a blow-molded hollow plastic main body, such as a duct, hose or tube, e.g., an air-intake duct, and a connector pipe integrally bonded to the main body. In accordance with a preferred embodiment of a method of the present invention, a reinforce member having a predefined welding surface is integrally formed on a blow-molded hollow main body as a first step. The reinforce member is typically formed from a resin material by injection molding. In this case, preferably, the reinforce member is placed in a mold as an insert, and a parison is then placed in the mold and blow-molded to define a predetermined hollow main body thereby having the reinforce member formed integrally with the main body. Alternatively, first, the hollow main body may be formed by blow molding, and, then the reinforce member may be integrally bonded to the main body, for example, by a thermal process. Then, as a second step, one end surface of a connector pipe is thermally welded to a portion of the blow-molded hollow main body and also a portion of the reinforce member. Thereafter, as a third step, a fluid communication is defined between the main body and the connector pipe. In this case, preferably, a hole is formed, for example by drilling, at a predetermined position of the welding surface and a corresponding portion of the main body, so that a through-hole is formed to extend between the interior of the main body and the interior of the connector pipe.

Preferably, the reinforce member is formed generally in the shape of a ring so that the reinforce member extends around a predetermined axial position of the hollow main body. The reinforce member itself may have a multi-segment structure, preferably two segments, in which case each segment may be used as an insert when blow-molding the hollow main body. These segments are preferably assembled together when the hollow main body is blow-molded to thereby define an integrated multi-segment reinforce member which is also integrally formed with the hollow main body. In the case of a multi-segment structure, it is preferable that each segment includes a clamp structure which mates with a corresponding clamp structure of the adjacent segment. In addition, preferably, a clamp structure is also provided between the reinforce member and the hollow main body.

As an example, the clamp structure may be a combination of a dove-tail projection and a corresponding dove-tail notch which mate together. For example, a plurality of dove-tail projections may be provided at the outer surface of the hollow main body arranged spaced apart from each other around a circumference of the hollow main body, and a plurality of corresponding dove-tail notches may be provided at the inner surface of the reinforce member so that each dove-tail projection may mate or engage with the corresponding dove-tail notch, which allows to obtain an increased mechanical and intimate contact strength. Thus, even if the hollow main body is comprised of a soft rein material to provide some flexibility, the hollow main body may remain integrated with the reinforce member sufficiently.

The ring-shaped reinforce member has a welding surface of a defined shape, which includes a hole to expose a portion of the wall, or outside surface, of the hollow main body. With this structure, the end surface of the connector pipe becomes thermally welded not only to a corresponding portion of the welding surface of the reinforce member, but also to a corresponding portion of the main body such that a sufficient air-tight and mechanical bonding structure is provided when a through-hole is formed between the connector pipe and the main body.

Furthermore, the reinforce member has an increased flexibility in design so as to obtain a sufficient bonding strength when welled to the connector pipe. If desired, the welding surface of the reinforce member may be so designed to be larger in size than the outer diameter of the hollow main body, so that a connector pipe large in diameter, that was not possible to be used in the past, can be used in the present invention.

As mentioned above, there is provided a hollow plastic product, such as a duct, hose or pipe, by providing a hollow main body insert-molded with a reinforce member having a defined welding surface, thermally welding one end surface of a connector pipe to a portion of the welding surface and also a portion of the main body, and providing a through-hole extending between an interior of the hollow main body and an interior of the connector pipe. Because of the provision of the reinforce member having a defined welding surface, there is provided an increased flexibility in structure and design of a connector pipe, and, moreover, a connector pipe can be properly added or bonded to the main body even if the hollow main body is comprised of a soft resin material. Therefore, there is provided a hollow plastic product, such as a duct, hose or tube having a connector pipe excellent and high flexibility in design. More specifically, it is possible to obtain such advantages as increased bonding strength and air-tightness at a connection point between the main body and the connector pipe, an increased degree of freedom in structure and design of a connector pipe, and an increased degree of selection of a material for the main body and the connector pipe, in particular the allowability of using a soft resin material for the main body.

It is an object of the present invention to provide a method for manufacturing an improved hollow plastic product having a connector pipe.

DETAILED DESCRIPTION OF THE PREFERRED EMBODIMENTS

Figure 1A:
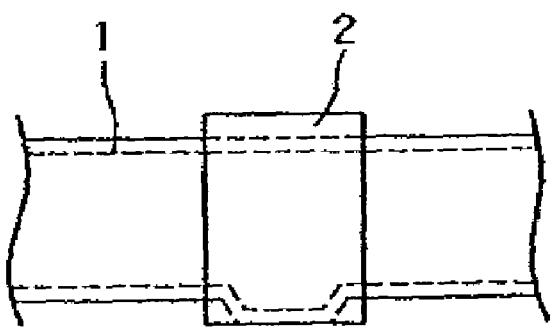
FIG. 1(a) is a schematic illustration showing in front view a hollow plastic product including a hollow main body and a reinforce member, to which a connector pipe is to be constructed.

Referring now to FIGS. 1(a) and (b), there is schematically shown a hollow main body or hose 1 which is formed by blow molding. A reinforce member 2 formed by injection molding and generally in the shape of a ring is integrally provided on or added to the main body 1 by insert molding. The main body 1 is comprised of a first resin material and the reinforce material is comprised of a second resin material, which may be same as the first resin material. The reinforce member 2 may be integrally added to the main body 1, for example, by placing the reinforce member 2 in a mold when blow-molding the main body 1 in the mold. In this case, a parison placed in the mold becomes inflated by blow-molding so that the reinforce member 2 may be integrally added to the main body 1. The reinforce member 2 may be of a multi-segment structure, in which case the segments may be so structured to be integrated together when the main body 1 is blow-molded. Alternatively, the main body 1 alone may be blow-molded and the reinforce member 2 may be integrated to the main body 1, for example, by bonding, welding or the like.

Preferably, the reinforce member 2 is in the shape of a ring, when assembled in the case of a multi-segment structure. Thus, the reinforce member 2 extends around the main body 1 at a predetermined location circumferentially. The reinforce member 2 has a welding surface 3, which is flat in the example shown in FIGS. 1(a) through (c) and which has a predetermined area for bonding with an end surface of a connector pipe 5 by welding with a sufficient bonding strength. The welding surface 3 or a corresponding portion of the reinforce member 2 is provided with a through-hole into which a corresponding portion of the main body 1 extends and thus is exposed.

Figure 1C:
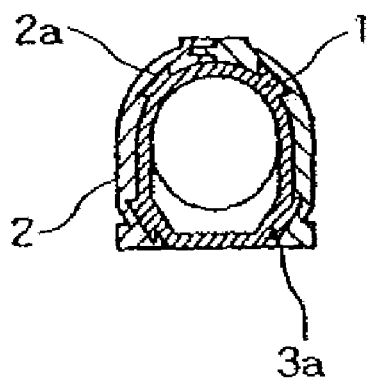
FIG. 1(c) is a schematic illustration showing in transverse cross section of the hollow plastic product shown in FIG. 1(a)
Figure 1B:
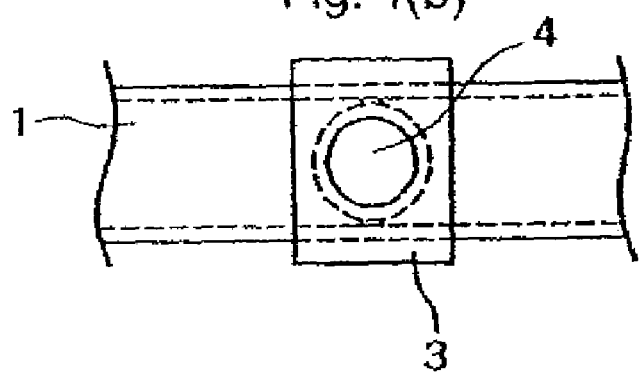
FIG. 1(b) is a schematic illustration showing in bottom view of the hollow plastic product shown in FIG. 1(a)

More specifically, in the embodiment shown in FIGS. 1(a) through (c), a portion of the main body 1 extends radially in the form of a mesa and this mesa-shaped portion extends into the hole formed in the reinforce member 2 so that the outside surface of this mesa-shaped portion is exposed in and flush with the welding surface 3. In addition, as best shown in FIG. 1(c), the main body 1 is formed with a plurality of dove-tail shaped projections 2a arranged in the circumferential direction as spaced apart from each other, and the reinforce member 2 is formed with a plurality of corresponding dove-tail shaped notches 3a mating with the respective dove-tail shaped projections 2a, thereby defining a mechanical clamp structure between the main body 1 and the reinforce member 2. Such a mechanical clamp structure is most easily given in the case of blow-molding. Described more in detail in this respect, in the case of providing such a mechanical clamp structure by blow molding, it is only necessary to provide the dove-tail notches 3a when fabricating the reinforce member 2 by injection molding. And, if the reinforce member 3 is used as an insert to form the main body 1 by blow molding, the parison will be partly pushed into the dove-tail notches 3a while being in a molten state to define itself the dove-tail projections 2a during the course of blow molding. As shown in FIG. 3(c), it should be noted that the welding surface 3 has a size in the radial direction of the main body 1 that is larger than the outer diameter of the main body 1, so that the welding surface 3 contributes to provide an increased bonding strength when the connector pipe 5 is welded thereto.

Figure 2A:
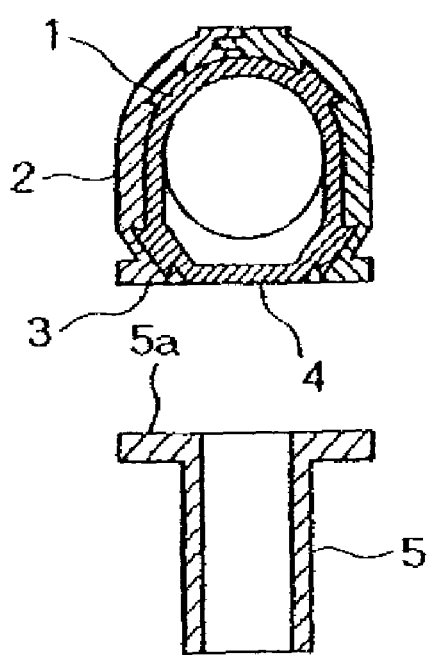
FIG. 2(a) is a schematic illustration showing in transverse cross section a state prior to the welding step of the present invention.
Figure 2B:
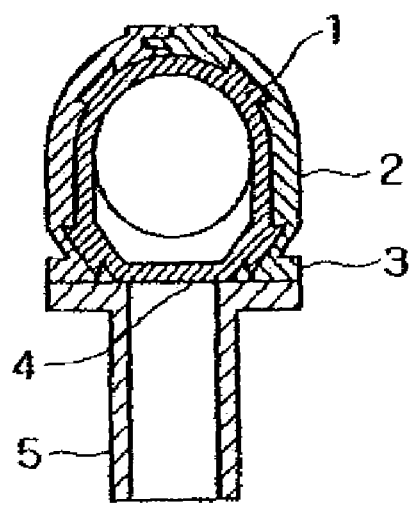
FIG. 2(b) is a schematic illustration showing in transverse cross section a state after the welding step of the present invention.

FIGS. 2(a) and (b) illustrate the welding step of the present invention. That is, FIG. 2(a) shows the state before a top end surface 5a of the connector pipe 5 is thermally welded to the welding surface 3 and FIG. 2(b) shows the state after the top end surface 5a of the connector pipe 5 has been thermally welded to the welding surface 3. Of importance, in the example shown in FIGS. 2(a) and (b), the diameter of the through-hole formed in the welding surface 3 is larger than the inner diameter of the connector pipe 5. Thus, the top end surface 5a of the connector pipe 5 is in contact not only with the welding surface 3 but also with an outer peripheral portion of the mesa-shaped portion 4 of the main body 1. With this structure, when welded thermally, the top end surface 5a becomes welded not only to the welding surface 3, but also to the outer peripheral portion of the mesa-shaped portion 4 of the main body 1. This is particularly advantageous in providing an increased bonding strength and an air-tight or sealing structure.

Figure 3A:
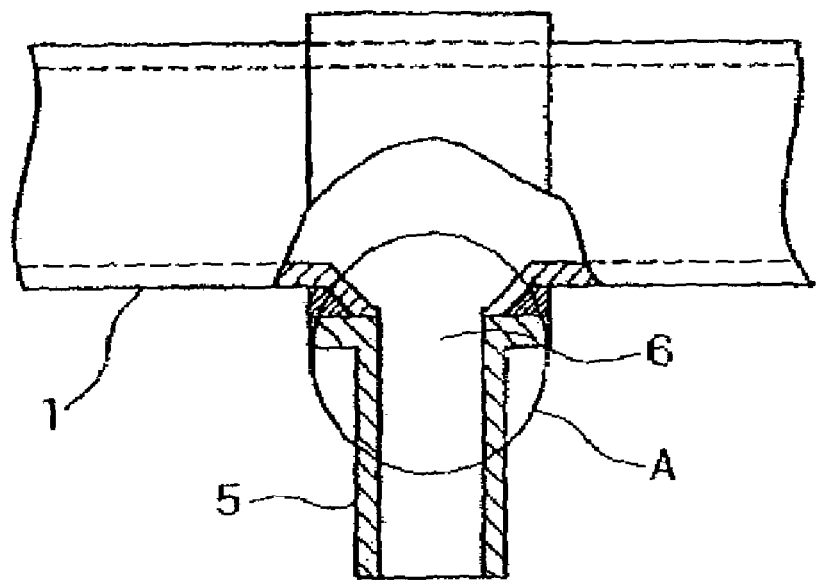
FIG. 3(a) is a schematic illustration showing partly in cross section a hollow plastic product having a connector pipe constructed in accordance with one embodiment of the present invention.
Figure 3B:
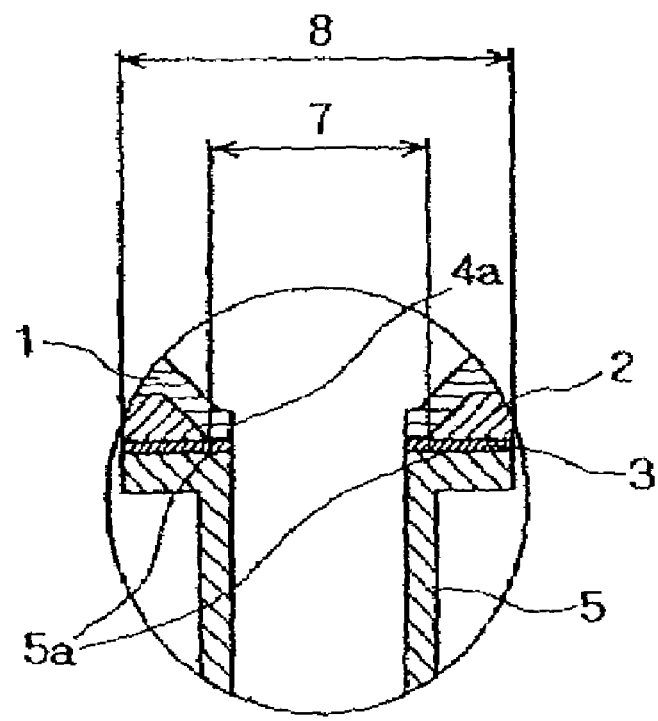
FIG. 3(b) is a schematic illustration showing in enlarged view of the circled area in FIG. 3(a)
Figure 4A:
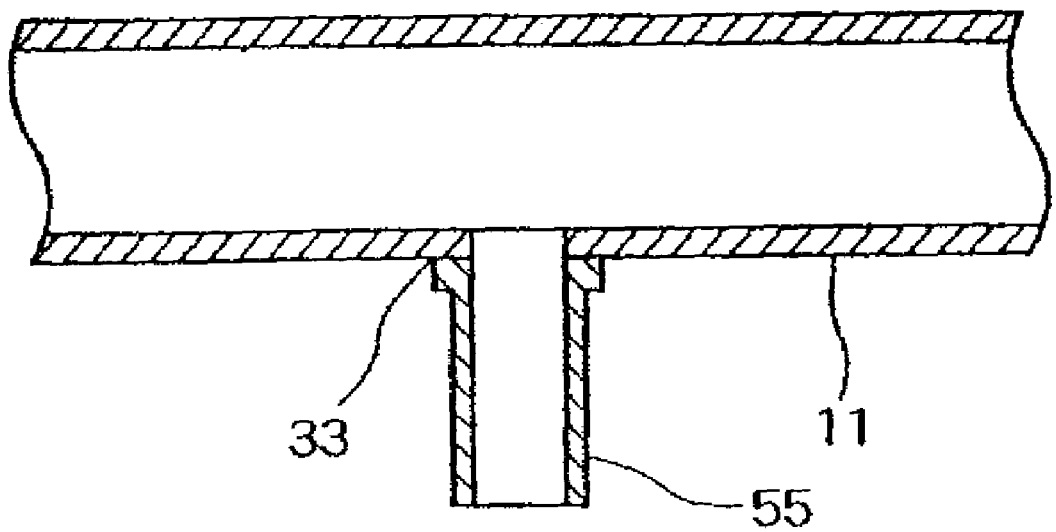
FIG. 4(a) is a schematic illustration showing the structure of a typical conventional plastic product having a connector pipe.
Figure 4B:
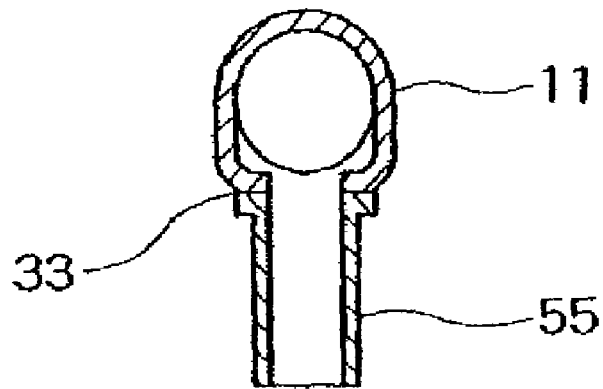
FIG. 4(b) is a schematic illustration showing in transverse cross section of the conventional plastic product shown in FIG. 4(a).

FIG. 3(a) is a schematic illustration showing partly in cross section a completed hollow plastic product having a connector pipe constructed in accordance with one embodiment of the present invention and FIG. 3(b) shows an enlarged view of the circled section in FIG. 3(a). As shown in FIG. 3(a), after the connector pipe 5 has been thermally welded to the welding surface 3 as shown in FIG. 2(b), the mesa-shaped portion 4 of the main body 1 has been removed, for example, by drilling to define a through-hole or communication port 6 which established a fluidic communication between the interior of the main body 1 and the interior of the connector pipe 5. As best shown in FIG. 3(b), a remaining outer peripheral portion 4a of the mesa-shaped portion 4 of the main body 1 is thermally welded to a corresponding inner peripheral portion of the top end surface 5a of the connector pipe 5 to thereby define an air-tightness enhanced welded film section 7. In addition, the welding surface 3 of the reinforce member 2 is thermally welded to the remaining section of the top end surface 5a of the connector pipe 5 to thereby define a welding strength enhanced welded film section 8 which is contiguous with the air-tightness enhanced welded film section 7. The provision of such contiguous welded film sections 7 and 8 allows to obtain an increased air-tight or sealing characteristic and bonding strength between the connector pipe 5 and the main body 1.

According to the experiments conducted by the present inventors with respect to the above-described embodiments, it has been found that such combinations of materials used for the main body 1, reinforce member 2 and the connector pipe 5 as shown in tables 1 and 2 below can provide excellent results in bonding strength and sealing or air-tightness.

TABLE 1

Combination 1 of Resin Materials
(Combination Of Olefin Family Thermoplastic Resins)

|  | PP | PP-GF | TPO |
|---|---|---|---|
| Main Body | ○ | ○ | ○ |
| Reinforce Member | ○ | ○ | ○ |
| Connector Pipe | ○ | ○ | ○ |

PP: Polypropylene
PP-GF: Glass Fiber Reinforced Polypropylene
TPO: Olefin Family Elastomer (Soft Resin)

TABLE 2

Combination 2 of Resin Materials
(Combination Of Polyamide Family Thermoplastic Resins)

|  | PA6 | PA6-GF | TPAE |
|---|---|---|---|
| Main Body | ○ | ○ | ○ |
| Reinforce Member | ○ | ○ | ○ |
| Connector Pipe | ○ | ○ | ○ |

PA6: Polyamide 6
PA6-GF: Glass Fiber Reinforced Polyamide 6
TPAE: Polyamide Family Elastomer (Soft Resin)

Although any combination of materials for the main body 1, reinforce member 2 and connector pipe 5 may be selected as long as it is a thermoplastic material, an example of such a combination as shown in Table 1 above includes PP for the main body 1, PP-GF for the reinforce member 2 and TPO for the connector pipe 5 and another example as shown in Table 2 above includes TPAE for the main body 1, PA6 for the reinforce member 2 and TPAE for the connector pipe 5. Thus, it is clear that use may be made of a combination of such materials which could not be used in the conventional art. It should be noted that the combinations of materials listed above should not be construed to be limiting and other combinations such as PBT (hard resin)/TPEE (soft resin) may also be used as long as they can be used for blow molding.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A method for manufacturing a hollow plastic product, the method comprising:
    forming a reinforce member in a desired shape having a defined welding surface formed with a first hole by injection molding;
    forming a hollow main body by blow molding using said reinforce member as an insert, thereby having said reinforce member integrally formed with said hollow main body and having a portion of said hollow main body extended into said first hole in the shape of a mesa when blow-molded such that said mesa-shaped portion has an outside surface exposed in said first hole and flush with said welding surface;
    thermally welding a top end surface of a connector pipe to said welding surface and also to an outer peripheral portion of said outside surface of said mesa shaped portion; and
    forming a second hole in said outside surface of said mesa shaped portion to be aligned with said first hole, thereby forming a fluidic communication passage between an interior of said hollow main body and an interior of said connector pipe and defining a first welded film section between said welding surface and a first corresponding portion of said top end surface and a second welded film section, which is contiguous with said first welded film section, between a remaining portion of said outer peripheral portion of said outside surface of said mesa shaped portion and a second corresponding portion of said top end surface.

2. The method of claim 1, wherein when forming said reinforce member by injection molding, a plurality of first engaging portions are formed in an interior surface of said reinforce member, and said hollow main body partially extends into said plurality of first engaging portions during blow molding to thereby define, a plurality of second engaging portions corresponding in shape in a mating relationship to said plurality of first engaging portions so that said first and second engaging portions define a clamp structure.

3. The method of claim 2, wherein said reinforce member has a multi-segment structure.

* * * * *